(12) United States Patent
McDaniel et al.

(10) Patent No.: US 9,068,027 B2
(45) Date of Patent: Jun. 30, 2015

(54) METHODS OF PREPARING A POLYMERIZATION CATALYST

(71) Applicant: Chevron Phillips Chemical Company LP, The Woodlands, TX (US)

(72) Inventors: Max P. McDaniel, Bartlesville, OK (US); Kathy S. Collins, Bartlesville, OK (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 0 days.

(21) Appl. No.: 13/801,193

(22) Filed: Mar. 13, 2013

(65) Prior Publication Data

US 2014/0275458 A1    Sep. 18, 2014

(51) Int. Cl.
  *C08F 4/16* (2006.01)
  *C08F 10/00* (2006.01)

(52) U.S. Cl.
  CPC ....................................... *C08F 10/00* (2013.01)

(58) Field of Classification Search
  CPC .............. C08F 4/24; C08F 4/025; C08F 4/22; C08F 4/02; B01J 23/26
  See application file for complete search history.

(56) References Cited

U.S. PATENT DOCUMENTS

| | | |
|---|---|---|
| 3,248,179 A | 4/1966 | Norwood |
| 3,862,104 A | 1/1975 | Witt |
| 3,976,632 A | 8/1976 | Delap |
| 4,053,436 A | 10/1977 | Hogan et al. |
| 4,397,769 A * | 8/1983 | McDaniel et al. ............ 502/256 |
| 4,501,885 A | 2/1985 | Sherk et al. |
| 4,588,790 A | 5/1986 | Jenkins, III et al. |

(Continued)

FOREIGN PATENT DOCUMENTS

| | | |
|---|---|---|
| EP | 0805164 | 11/1997 |
| GB | 790196 | * 2/1958 |

(Continued)

OTHER PUBLICATIONS

Invitation to Pay Additional Fees for PCT/US2014/022663 dated Sep. 18, 2014.

*Primary Examiner* — Ling Choi
*Assistant Examiner* — Catherine S Branch
(74) *Attorney, Agent, or Firm* — Rodney B. Carroll; Cheryl L. Huseman; Conley Rose, P.C.

(57) ABSTRACT

A method comprising contacting a silica support material with a sulfating agent to form a sulfated silica support material comprising sulfate anions; thermally treating the sulfated silica support material to form a thermally treated sulfated silica support material; contacting the thermally treated sulfated silica support material with a chromium-containing compound to form a mixture; and thermally treating the mixture to form a polymerization catalyst. A method comprising thermally treating a silica support material to form a thermally-treated silica support material; contacting the thermally-treated silica support material with a sulfating agent to form a thermally treated sulfated silica support material; thermally treating the thermally treated sulfated silica support material to form a processed silica support material; contacting the processed silica support material with a chromium-containing compound to form a precursor polymerization catalyst; and thermally treating the precursor polymerization catalyst to form a polymerization catalyst.

22 Claims, 3 Drawing Sheets

(56) References Cited

U.S. PATENT DOCUMENTS

| | | |
|---|---|---|
| 5,231,066 A | 7/1993 | Rekers et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 6,239,235 B1 | 5/2001 | Hottovy et al. |
| 6,262,191 B1 | 7/2001 | Hottovy et al. |
| 6,833,415 B2 | 12/2004 | Kendrick et al. |
| 7,214,642 B2 | 5/2007 | McDaniel et al. |
| 7,763,561 B2 | 7/2010 | McDaniel et al. |
| 7,884,163 B2 | 2/2011 | McDaniel et al. |
| 2012/0041160 A1* | 2/2012 | Benham et al. ............ 526/105 |

FOREIGN PATENT DOCUMENTS

| | | |
|---|---|---|
| GB | 2068982 | 8/1981 |
| WO | 9960033 A1 | 11/1999 |

* cited by examiner

US 9,068,027 B2

METHODS OF PREPARING A POLYMERIZATION CATALYST

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure relates to catalysts. More specifically, the present disclosure relates to methods of preparing polymerization catalysts.

2. Background

Polymerization catalysts are known in the art, however methods of producing these catalysts may suffer from a variety of drawbacks. Enhancements in preparation methods for polymerization catalysts can reduce the costs associated with catalyst production and improve process economics. Thus, there is an ongoing need to develop new methods of preparing polymerization catalysts.

SUMMARY

Disclosed herein is a method comprising contacting a silica support material with a sulfating agent to form a sulfated silica support material comprising sulfate anions; thermally treating the sulfated silica support material to form a thermally treated sulfated silica support material; contacting the thermally treated sulfated silica support material with a chromium-containing compound to form a mixture; and thermally treating the mixture to form a polymerization catalyst.

Also disclosed herein is a method comprising thermally treating a silica support material to form a thermally-treated silica support material; contacting the thermally-treated silica support material with a sulfating agent to form a thermally treated sulfated silica support material; thermally treating the thermally treated sulfated silica support material to form a processed silica support material; contacting the processed silica support material with a chromium-containing compound to form a precursor polymerization catalyst; and thermally treating the precursor polymerization catalyst to form a polymerization catalyst.

Also disclosed herein is a method comprising contacting a silica support material with a sulfating agent and a chromium-containing compound to form a mixture; and thermally treating the mixture to form a polymerization catalyst.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
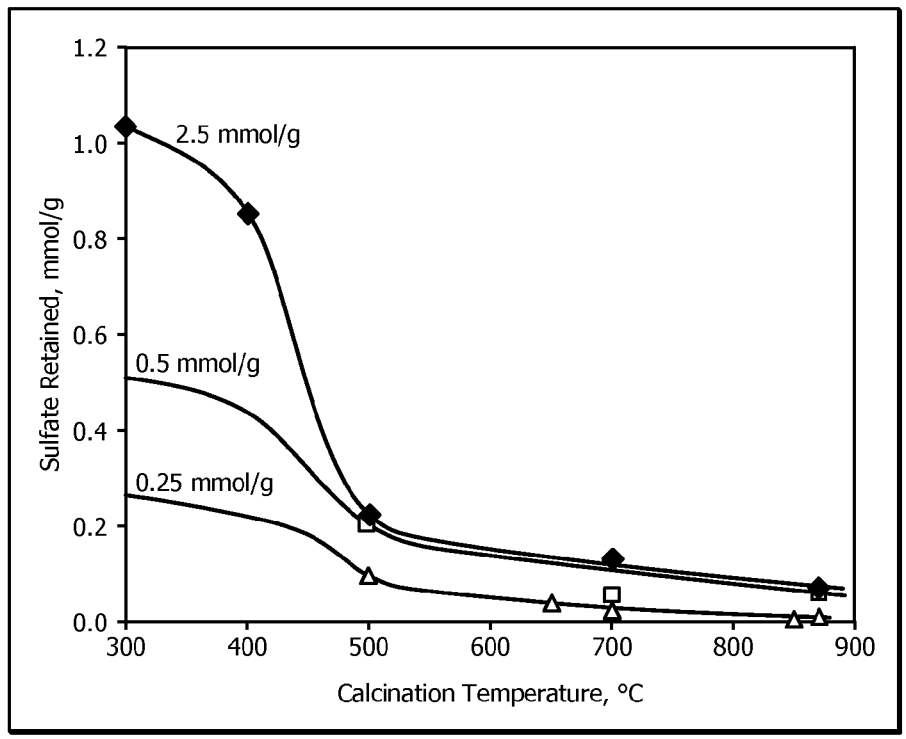
FIG. 1 is graph of the amount of sulfate retained by the catalyst as a function of calcination temperature for the samples from Example 1.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are sulfated silica-supported chromium catalysts and methods of making and using same. In an embodiment, a method of preparing the catalyst comprises contacting a support material with a chromium-containing compound and a sulfating agent. Such catalysts may function as polymerization catalysts and are herein designated CATs. CATs may be contacted with a monomer (e.g., olefin) under conditions suitable for the formation of a polymer. Polymers produced using CATs of the type disclosed herein may display improved processing and toughness properties as will be described in more detail later herein.

In various embodiments, the support material for the CAT comprises silica. The support material may have a surface area and pore volume effective to provide for the production of an active catalyst (e.g., polymerization catalyst). In an embodiment, the support material possesses a surface area in the range of from about 10 $m^2$/gram to about 1000 $m^2$/gram, a pore volume in the range of from about 0.1 $cm^3$/gram to about 4.0 $cm^3$/gram and an average particle size in the range of from about 5 µm to about 500 µm. In another embodiment, the support material has a surface area in the range of from about 50 $m^2$/gram to about 500 $m^2$/gram, a pore volume of from about 0.5 $cm^3$/gram to about 3.5 $cm^3$/gram, and an average particle size of from about 10 µm to about 200 µm. In yet another embodiment, the support material has a surface area in the range of from about 200 $m^2$/gram to about 400 $m^2$/gram, a pore volume from about 0.8 $cm^3$/gram to about 3.0 $cm^3$/gram, and an average particle size of from about 25 µm to about 150 µm. In still another embodiment, the support material has a surface area in the range of from about 200 $m^2$/gram to about 450 $m^2$/gram, a pore volume in the range of from about 1 $cm^3$/gram to about 2.5 $cm^3$/gram and an average particle size in the range of from about 40 µm to about 120 µm. In another embodiment, the support material has a surface area in the range of from about 250 $m^2$/gram to about 400 $m^2$/gram, a pore volume of from about 1.25 $cm^3$/gram to about 2.5 $cm^3$/gram, and an average particle size of from about 40 µm to about 120 µm. In yet another embodiment, the support material has a surface area in the range of from about 250 $m^2$/gram to about 600 $m^2$/gram, a pore volume in the range of from about 1.5 $cm^3$/gram to about 1.75 $cm^3$/gram, and an average particle size of from about 40 μm to about 120 μm. Generally, the average pore size of the support material ranges from about 10 Angstroms to about 1000 Angstroms. In one embodiment, the average pore size of the support material is in the range of from about 50 Angstroms to about 500 Angstroms, while in yet another embodiment the average pore size ranges from about 75 Angstroms to about 350 Angstroms. The support material may be prepared using any suitable methodology.

The support material may contain greater than about 50 percent (%) silica, alternatively greater than about 80% silica, alternatively greater than about 90% silica by weight of the support. The silica support material may be prepared using any suitable method, for example the silica support material may be prepared synthetically by hydrolyzing tetrachlorosilane ($SiCl_4$) with water or by contacting sodium silicate with a mineral acid. In an embodiment, the silica support material may have a surface area ranging from about 100 $m^2$/g to about 1000 $m^2$/g and a pore volume ranging from about 0.1 cc/g to about 2.8 cc/g. An example of silica support material suitable for use in this disclosure includes without limitation ES70 which is a silica support material with a surface area of 300 $m^2$/g, and a pore volume of 1.6 cc/g that is commercially available from Inneos Co.

The support material may include additional components that do not adversely affect the CAT, such as zirconia, alumina, thoria, magnesia, fluoride, sulfate, phosphate, or mixtures thereof. In some aspects the support material excludes titania.

In embodiments, the support material comprises a virgin support. Herein, a virgin support refers to a support material that has not been contacted with and/or does not comprise a polymerization active compound. Such virgin supports may be commercially available compounds that are used "as is" having not undergone any additional treatment following manufacture by a supplier, and thus are in an unadulterated state. Herein, a polymerization active compound refers to a compound or species which may catalyze a polymerization reaction (e.g., polymerization of alpha olefins) or a precursor of such compounds or species.

In embodiments, the virgin support does not comprise an amount of one or more metals effective to catalyze a polymerization reaction such as olefin polymerization. For example, the virgin support does not include Group VI metals such as Cr, Mo, and/or W in amounts effective to catalyze polymerization reactions. In an embodiment, the virgin support does not comprise chromium or a chromium-containing compound in an amount effective to catalyze a polymerization reaction. In an embodiment, the support material is a virgin support that has not undergone any additional heat treatment since being manufactured, or alternatively has not been previously heated to a temperature of equal to or greater than about 200° C.

The catalyst (i.e., CAT) may have a support material content of from about 60 wt. % to about 90 wt. % based on the final weight of the CAT, alternatively from about 70 wt. % to about 90 wt. %, alternatively from about 80 wt. % to about 95 wt. %. Herein, the final weight of the CAT refers to the weight of the CAT after all processing steps.

In an embodiment, the CAT comprises chromium. Chromium may be introduced to the CAT via contacting one or more of the components of the CAT (e.g., the support material) with a chromium-containing compound. The chromium-containing compound may be one or more compounds comprising chromium in the hexavalent oxidation state (hereinafter Cr(VI)) or comprising a material suitable for conversion to Cr(VI). In an embodiment, the chromium-containing compound comprises a water-soluble chromium-containing compound; alternatively the chromium-containing compound comprises a hydrocarbon-soluble chromium compound. The chromium-containing compound may be a chromium (II) compound, a chromium (III) compound, or combinations thereof.

Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromic fluoride, chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof.

Examples of other suitable chromium-containing compounds include without limitation tertiary butyl chromate in a hydrocarbon liquid; chromium trioxide in water; chromium acetate in water; chromium nitrate in alcohol; zerovalent organochromium compounds such as pi bonded chromium complexes, for example, dicumene chromium and dibenzene chromium; or combinations thereof. Pi bonded chromium complexes are described in U.S. Pat. No. 3,976,632, which is incorporated by reference herein in its entirety.

In an embodiment, the CAT has a chromium content of from about 0.1 wt. % to about 10 wt. % based on the final weight of the CAT, alternatively from about 0.2 wt. % to about 5 wt. %, alternatively from about 0.5 wt. % to about 2 wt. %. The final weight of the CAT refers to the weight of the CAT after all processing steps used to prepare the CAT.

In an embodiment, the CAT comprises one or more compounds which when contacted with the support material (e.g., silica) serves to increase the acidity of the support material. Any material that increases the Lewis or Bronsted acidity of the support material upon treatment and is compatible with the other components of the CAT may be suitably employed. In one aspect, the CAT comprises a sulfate anion.

In an embodiment, the sulfate anion is introduced to the support by contacting the support with a sulfating agent. As used herein, "sulfating agent" refers to a material capable of providing a sulfate anion to the support material. In an embodiment, the sulfating agent is a sulfate-containing salt, a sulfate-containing acid, or other compound such as a volatile organic compound that may serve as a source for the sulfate anion. When the CAT comprises a sulfate salt, the counterion or cation of that salt may be any cation that allows the salt to revert or decompose back to the acid during preparation of the CAT. Factors that dictate the suitability of a particular salt to serve as a source for the sulfate anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations include, but are not limited to, ammonium, trialkyl ammonium, tetraalkyl ammonium, tetraalkyl phosphonium, $H^+$, $[H(OEt_2)_2]^+$ and the like.

In an embodiment, the sulfating agent is in the form of a solution, a gas, or combinations thereof. Examples of sulfating agents suitable for use in the present disclosure include without limitation $SO_3$ gas; $H_2SO_4$ in water or an organic liquid such as an alcohol; aqueous solutions comprising at least one of the following compounds: $(NH_4)_2SO_4$, $Al_2(SO_4)_3$, $CuSO_4$, $ZnSO_4$, $ZrOSO_4$, $TiOSO_4$, $(NH_4)HSO_4$, $NaHSO_4$, $(NH_4)HSO_3$, $CaSO_4$ and $Cr_2(SO_4)_3$, and combinations thereof.

In an embodiment, the sulfate anion is introduced to the CAT by a sulfating-precursor material. Sulfating-precursor materials are compounds that are capable of providing a sulfate anion after being subjected to one or more of the steps utilized in preparation of the CAT. For example the sulfating precursor material may be oxidized to form a sulfate anion.

In an embodiment, the CAT has a sulfate anion content of from about 0.1 wt. % to about 3 wt. %, alternatively from about 0.3 wt. % to about 2 wt. % or alternatively from about 0.5 wt. % to about 2 wt. % based on the weight of the support.

In an embodiment, a method of preparing a CAT comprises contacting a support material (e.g., silica) with one or more sulfating agents and one or more chromium-containing compounds. In the various embodiments disclosed herein, contacting of the CAT components may occur in one or more contact zones. A contact zone is a zone in which the components are commingled and/or combined, and thereby contacted. The contact zone may be disposed in a vessel, e.g. a storage tank, tote, container, mixing vessel, reactor, etc.; a length of pipe, e.g. a tee, inlet, injection port, or header for combining component feed lines into a common line; or any other suitable apparatus for bringing the components into contact. As used herein, the terms contacted and combined refer to any addition sequence, order, or concentration for contacting or combining two or more catalyst components. As a result of such contact or combination, the catalyst components (e.g., Cr-containing compound and support material) may remain as discrete, unattached or unbonded particles or may otherwise physically not combine, attach, bond, co-support, agglomerate, etc., for example until such time as the components undergo further processing or treatment (e.g., a heat treatment) as disclosed herein. In some embodiments, contacting of components may occur in one or more upstream contact zone(s) prior to further contacting with other catalyst component(s) in one or more downstream contact zone(s). Where a plurality of contact zones are employed, contacting may occur simultaneously across the contact zones, sequentially across the contact zones, or both, as is suitable for a given embodiment. Contacting may be carried out in a batch or continuous process, as is suitable for a given embodiment. In an embodiment, the CAT components (e.g., support material, Cr-containing compound and sulfate anion) are contacted in a commercial polymerization reactor and/or in a catalyst activator vessel upstream of a commercial polymerization reactor.

In embodiments utilizing a vessel for contacting the components, the components may be optionally mixed by a mixer disposed in the vessel and the formed mixture may then be further processed. In embodiments, utilizing a tee or other means for combining lines such as a header, an optional in-line mixer may be placed in the commingled catalyst feed line to ensure that adequate contacting of the combined components takes place, and the mixture is thus formed as it passes through the commingled feed line.

The contacting of the catalyst components may be carried out simultaneously or separately in any order desired by the user and compatible with the process. For example, the sulfating agent and/or chromium-containing compound may be contacted with the support material utilizing methods such as ion-exchange, incipient wetness, pore fill, aqueous impregnation, organic solvent impregnation, melt coating, cogelation, or the like.

In an embodiment, a method of preparing a CAT comprises contacting a support material (e.g., silica) with one or more sulfating agents to form a sulfated support material. In an embodiment, the support material is silica and following contact with a sulfating agent a sulfated silica support material is formed. The sulfated support material may be formed by impregnation of the support material with a solution comprising a sulfating agent of the type disclosed herein. For example, the support material (e.g., silica) may be impregnated with a solution containing a sulfating agent, such as $H_2SO_4$, to form a sulfated support material. In another embodiment, the sulfating agent may be spray-dried onto the support material. In some embodiments, a sulfated support material is formed by contacting the support material with one or more sulfating precursor materials. As will be understood by one of ordinary skill in the art and as described herein, while the support material contacted with the sulfating precursor material is termed a "sulfated support material" the sulfating precursor material provides moieties/compounds to the support material that will later be converted to the sulfate anion.

In an embodiment, the sulfated support material is thermally treated to form a thermally treated sulfated support material. The sulfated support material may be thermally treated by heating the sulfated support material to a temperature of less than about 900° C., alternatively of from about 300° C. to about 900° C., alternatively from about 400° C. to about 800° C., or alternatively from about 500° C. to about 700° C. in an oxidizing (e.g., air), reducing (e.g., carbon monoxide), or inert (nitrogen) atmosphere. Thermal treatment may further comprise heating the material to a desired temperature in one or more stages. As used herein, the term "stages" refers to heating the material to a desired temperature and holding the temperature for a period of time. A stage may be performed when the material is in a stationary position or by moving the material through various locations and may comprise a ramp up time to a desired temperature and holding the material at that temperature for a certain hold time. For two or more stages, there will be two or more ramp up times, two or more desired temperatures, and two or more hold times. The ramp up times may be the same or different, for example the ramp up time may be instantaneous (e.g., preheated environment) to less than about 10 hours.

Thermal treatment of the sulfated support material may be carried out for a time period of from about 1 min to about 24 hours, or from about 30 min to about 15 hours, or from about 1 hr to about 10 hours. The resulting material is termed a thermally treated sulfated support material. In an embodiment, the support material is a sulfated silica and following thermal treatment is a thermally treated sulfated silica support material. It is contemplated that the thermal treatments disclosed herein may be carried out in stages or may be instantaneous.

A method of preparing a CAT of the type disclosed herein may further comprise contacting a thermally treated sulfated support material with a Cr-containing compound of the type disclosed herein (e.g., $Cr(acac)_3$) to form a mixture. Contacting of the Cr-containing compound with the thermally treated sulfated support material may be carried out using any suitable contact zone and/or methodology such as those previously described herein.

In an embodiment, the method further comprises thermal treatment of the mixture to form a CAT. The mixture may be thermally treated (e.g., calcined) by heating in an oxidizing atmosphere to a temperature of less than about 900° C., alternatively from about 300° C. to about 900° C., alternatively from about 400° C. to about 800° C., alternatively from about 500° C. to about 700° C. for a time period of from about 1 min to about 24 hrs., or from about 30 min to about 15 hrs., or from about 1 hr. to about 10 hrs. In embodiments, the mixture is thermally treated in an oxygen-containing atmosphere (e.g., dry air). In such embodiments, the chromium (III) which was introduced to the CAT by the chromium-containing compound may be oxidized to chromium (VI). In such embodiments, the percentage conversion of Cr(III) to Cr(VI) may range from about 20% to about 100%, alternatively from about 30% to about 100% or alternatively from about 40% to about 100%.

In an alternative embodiment, a method of preparing a CAT comprises thermally treating a support material (e.g., silica) to form a thermally-treated support material. For example the support material may be thermally treated by heating the support material to a temperature of from about 300° C. to about 900° C., alternatively from about 400° C. to about 800° C., alternatively from about 500° C. to about 700° C. in an oxidizing (e.g., air), reducing (e.g., carbon monoxide), or inert (nitrogen) atmosphere to form a thermally-treated support material. In an embodiment, the support material is silica and following thermal treatment forms a thermally-treated silica support material.

The method of preparing a CAT may further comprise contacting the thermally-treated support material with a sulfating agent (or sulfating precursor material) to form a thermally-treated sulfated support material (e.g., a thermally-treated sulfated silica support material). The thermally-treated sulfated support material may be subsequently subjected to an additional thermal treatment by heating the material to a temperature of less than about 900° C., alternatively of from about 300° C. to about 900° C., alternatively from about 400° C. to about 800° C., alternatively from about 500° C. to about 700° C. in an oxidizing (e.g., air), reducing (e.g., carbon monoxide), or inert (nitrogen) atmosphere for a time period of from about 1 min to about 24 hr, alternatively from about 30 min to about 15 hrs. or alternatively from about 1 hr. to about 10 hrs. to form a processed support material.

The processed support material may then be contacted with a Cr-containing compound to form a precursor CAT. Contacting of the processed support material with the Cr-containing compound may be carried out using any suitable methodology such as those described herein (e.g., incipient wetness impregnation). In an embodiment of the method, the precursor CAT is thermally treated by heating to a temperature of from about 300° C. to about 900° C., alternatively from about 400° C. to about 800° C., or alternatively from about 500° C. to about 700° C. in an oxidizing atmosphere for a time period of from about 1 min to about 24 hrs, alternatively from about 30 min. to about 15 hrs or alternatively from about 1 hr to about 10 hrs to form a CAT.

In yet another embodiment, a method of preparing a CAT comprises contacting a support material of the type disclosed herein (e.g., silica) with a Cr-containing compound and a sulfating agent (or sulfating precursor material) to form a mixture. The support material may be contacted simultaneously or sequentially with the Cr-containing compound and sulfating agent (or sulfating material precursor) to form the mixture. Contacting of the support material with a Cr-containing compound and a sulfating agent (or sulfating precursor material) may be carried out using any suitable methodology such as those described herein (e.g., incipient wetness impregnation).

The mixture may then be thermally treated by heating to a temperature range of less than about 600° C., alternatively from about 300° C. to about 900° C., alternatively from about 400° C. to about 800° C., alternatively from about 500° C. to about 700° C. in an oxidizing atmosphere for a time period of from about 1 min to about 24 hrs, alternatively from about 30 min. to about 15 hrs or alternatively from about 1 hr to about 10 hrs to form a CAT.

During preparation of a CAT using any of the methodologies disclosed herein one or more components of the CAT may be introduced as a solution (e.g., aqueous solution of a sulfating agent or a solution of the chromium-containing compound). In such embodiments, the methods disclosed herein may further comprise removing all or a portion of the solvent that is introduced to the CAT by contact with the solution prior to implementing one or more of the thermal treatments disclosed herein. In an embodiment, the CAT is dried subsequent to contact with a solvent. For example, the material may be dried using standard techniques such as thermal treatment, spray drying, or contacting with a volatile liquid organic solvent. Examples of volatile liquid organic solvents include without limitation methyl isobutylketone, ethyl acetate, sec-butyl alcohol, n-propyl alcohol, butyraldehyde, diisobutyl ether, isopropyl acetate, 3-methyl-1-butanol, 1-pentanol, 2-pentanol, 1-hexanol or combinations thereof.

In an optional embodiment, one or more components utilized in preparation of the CAT is provided as a solution containing the component (e.g., sulfating agent) and a solvent (e.g., water). The resultant material contains components of the CAT and residual solvent. At least a portion of the solvent may be removed from the material by heating the material to a temperature of from about 30° C. to about 200° C., alternatively from about 50° C. to about 150° C. or alternatively from about 70° C. to about 120° C. for a time period of from about 1 min. to about 24 hrs, alternatively from about 30 min. to about 15 hrs, or alternatively from about 1 hr to about 10 hrs.

The polymerization catalysts of the present disclosure (i.e., CATs) are intended for any alpha olefin polymerization method, using various types of polymerization reactors. As used herein, "polymerization reactor" includes any polymerization reactor capable of polymerizing alpha olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor.

The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A suitable slurry polymerization process (also known as the particle form process), is disclosed for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, resistance to crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts prepared in accordance with the present disclosure may be used for the polymerization of olefins, for example, alpha-olefins. In an embodiment, the CAT is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene or the like.

In an embodiment, the catalyst is used to produce a polyethylene (PE) copolymer (e.g., a copolymer with 1-hexene). Alternatively, the catalyst is used to produce a PE homopolymer, alternatively a high density polyethylene (HDPE).

In an embodiment, PEs produced using CATs of the type disclosed herein have a melt index (MI) that is broadened with respect to PEs prepared using a conventional chromium catalyst. The MI refers to the amount of a polymer which can be forced through an extrusion rheometer orifice of 0.0825 inch diameter when subjected to a force of 2.16 kilograms in ten minutes at 190° C., as determined in accordance with ASTM D 1238. Herein, a conventional chromium catalyst refers to a silica-supported chromium catalyst prepared in the absence of sulfate. For example, polymers prepared using CATs of the type disclosed herein may have an MI ranging from about 0.01 g/10 min. to about 100 g/10 min, alternatively from about 0.1 g/10 min to about 10 g/10 min, or alternatively from about 0.15 g/10 min to about 5 g/10 min.

One of the advantages of the present disclosure is that the addition of sulfate to Cr/silica or Cr/silica-titania catalysts (i.e., catalysts of the type disclosed herein) increases the melt index of the resultant polymer, if all other variables are held constant. The melt index can be increased by from about 5% to about 200 fold, compared to the melt index of polymer obtained from an otherwise identical catalyst made without the addition of sulfate, under the same reaction conditions. Alternatively, the melt index can be increased by from about 10% to about 10 fold, alternatively from about 20% to about 5 fold, alternatively from about 30% to about 300%, or alternatively from about 50% to 150%.

An additional advantages of the present disclosure is that the addition of sulfate to Cr/silica or Cr/silica-titania catalysts (i.e., catalysts of the type disclosed herein) increases the high load melt index of the resultant polymer, if all other variables are held constant. The high load melt index can be increased by from about 5% to about 200 fold, compared to the melt index of polymer obtained from an otherwise identical catalyst made without the addition of sulfate, under the same reaction conditions. Alternatively, the high load melt index can be increased by from about 10% to about 10 fold, alternatively from about 20% to about 5 fold, alternatively from about 30% to about 300%, or alternatively from about 50% to about 150%.

An additional advantage of the present disclosure is that the addition of sulfate to Cr/silica or Cr/silica-titania catalysts (i.e., catalyst of the type disclosed herein) decreases the weight average molecular weight ($M_w$) of the resultant polymer, if all other variables are held constant. The $M_w$ can be decreased by from about 5% to about 99% when compared to the $M_w$ of a polymer obtained from an otherwise identical catalyst made without the addition of sulfate and prepared under the same reaction conditions. Alternatively, the $M_w$ can be decreased by greater than about 10%, alternatively by greater than about 20% to greater than about 30%, alternatively by greater than about 50%, alternatively by greater than about 60%, or alternatively by greater than about 80% when compared to the $M_w$ of a polymer prepared under otherwise identical conditions with an identical catalyst except for the absence of sulfate.

The $M_w$ of polymers produced using CATs of the type disclosed herein (e.g., PE) may range from about 50 kg/mol to about 600 kg/mol. Alternatively the $M_w$ of the polymers produced using CATs of the type disclosed herein range from about 60 kg/mol to about 500 kg/mol, alternatively from about 70 kg/mol to about 400 kg/mol, alternatively from about 80 kg/mol to about 300 kg/mol, or alternatively from about 100 kg/mol to about 200 kg/mol.

Polymers produced using CATs of the type disclosed herein may display a molecular weight distribution (MWD) that is broadened when compared to a conventional chromium catalyst. The MWD refers to the ratio of the weight average molecular weight to number average molecular weight, which is also referred to as the polydispersity index (PDI) or more simply as polydispersity. In an embodiment, polymers produced using CATs of the type disclosed herein may have a MWD ranging from about 5 to about 50, alternatively from about 7 to about 30, or alternatively from about 10 to about 25.

Polymers (e.g., PE) produced using CATs of the type disclosed herein may be formed into articles of manufacture or end use articles using techniques such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

In an embodiment, the articles fabricated from polymers of this disclosure display enhanced mechanical properties such as an increased environmental stress crack resistance when compared to an article fabricated from a dissimilar polymer. Herein, dissimilar polymers refer to polymers having a similar density and monomer composition but prepared by using different methodology and/or different catalyst compositions. Environmental stress cracking refers to the premature initiation of cracking and embrittlement of a plastic due to the simultaneous action of stress, strain and contact with specific chemical environments. Environmental Stress Crack Resistance (ESCR) measures a polymer's resistance to this form of damage.

EXAMPLES

The disclosure having been generally described, the following examples are given as particular embodiments of the disclosure and to demonstrate the practice and advantages thereof. It is understood that the examples are given by way of illustration and are not intended to limit the specification of the claims to follow in any manner.

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments. Unless otherwise stated, a small amount (0.01 to 0.10 grams normally) of the solid catalyst was first charged under nitrogen to the dry reactor. Next 1.2 liter of isobutane liquid was charged and midway through the isobutane addition, triethylaluminum to equal 1 ppm of the isobutane, was injected into the reactor. Then the reactor heated up to the specified temperature, 105° C. Finally, ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain the set pressure. After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Melt index (MI, g/10 min) was determined in accordance with ASTM D1238 at 190° C. with a 2,160 gram weight.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8× 300 mm) and were calibrated with a broad linear polyethylene standard (Phillips Marlex® BHB 5003) for which the molecular weight had been determined.

Example 1

CATs of the type disclosed herein were prepared by treating a chromium-supported silica or silica-titania catalyst with a source of sulfate. Two catalysts were used for these experiments. A Cr/silica catalyst was obtained from W.R. Grace Corp. under the name HA30W, having a surface area of 500 m$^2$/g and a pore volume of 1.6 mL/g. A Cr/silica-titania catalyst was also obtained from W.R. Grace under the trade name MAGNAPORE® 964, having a titanium content of 4 wt %, a surface area of about 550 m$^2$/g, and a pore volume of about 2.4 mL/g.

In these experiments, sulfate was incorporated into these catalysts in two ways. First, sulfuric acid was dissolved in water, about 3 mL of methanol for each gram of catalyst to be treated. Then this aqueous solution was added to the dry catalyst, to produce a damp sand consistency. In other words, the amount of liquid was chosen so that the catalyst would just adsorb it without forming a wet slurry. Then the catalyst was dried at 110° C. for 16 hours.

In the second method of incorporating sulfate, the catalyst was mixed, in the absence of any solvent, with the desired amount of ammonium sulfate. Then the mixture was calcined in a fluidized bed at the desired temperature. The ammonium sulfate decomposed during calcination releasing ammonia and also sulfuric acid vapors, so that the catalyst was uniformly treated with sulfate.

After one of these two sulfate treatments, the catalyst was calcined in a fluidized bed at the desired temperature in dry air at 0.1 ft/s, for three hours in dry air.

Cr-silica samples impregnated with 0.25, 0.5, or 2.5 mmol/g H$_2$SO$_4$ were then calcined to a temperature ranging from about 300° C. to 900° C. The amount of sulfate retained by the catalyst was determined by combustion analysis and the results are plotted in FIG. 1. The sulfate is quite volatile and is easily evaporated by heat. It can be seen that much sulfate is lost between 400° C. and 500° C. Sulfate was found to provide advantages when the activation temperature is kept low, such as less than 600° C.

The porosity and surface area of the CATs was determined by nitrogen porosimetry. Sulfate was found to have no effect on the porosity of the Cr/Si catalyst as both the pore volume and surface area of the catalyst was unaffected by impregnation with H$_2$SO$_4$. These results are presented in Table 1. Each number has been corrected for the added mass of the adsorbed sulfate at that temperature.

TABLE 1

| Temperature (° C.) | mmol sulfate remaining/g catalyst | Surface Area (m$^2$/g) | Pore volume (mL/g) |
| --- | --- | --- | --- |
| 300 | 1.15 | 467 | 1.38 |
| 400 | 0.93 | 458 | 1.36 |
| 500 | 0.23 | 483 | 1.64 |
| 700 | 0.07 | 482 | 1.63 |
| 871 | 0.03 | 447 | 1.43 |

Figure 2:
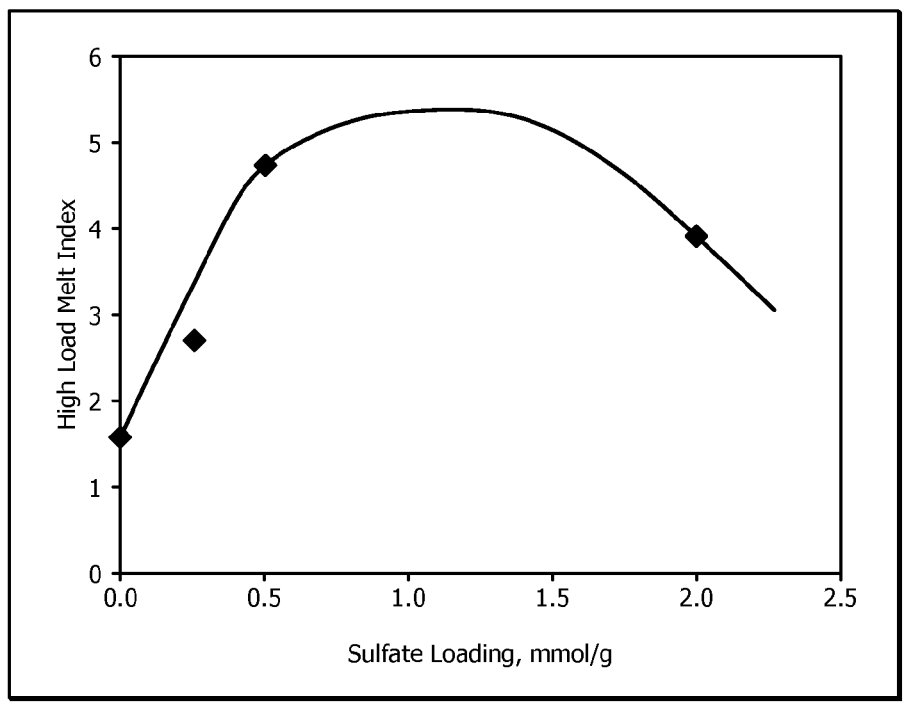
FIG. 2 is a plot of the high load melt index as a function of sulfate loading on the catalyst for the samples from Example 1.

Three CATs were prepared by impregnation of the above Cr/silica catalyst with H$_2$SO$_4$ to form mixtures. The mixtures were then dried at a temperature of 110° C. for a period of 16 hours before calcination at 500° C. for three hours. The resulting CATs were used to prepare polymer samples (at 105° C. and 550 psig as described above) and the high load melt index (HLMI) of the polymer samples determined. The high load melt index of the polymer samples was shown to increase when compared to that of polymers prepared with a Cr/silica in the absence of sulfate. These results are presented in FIG. 2.

Figure 3:
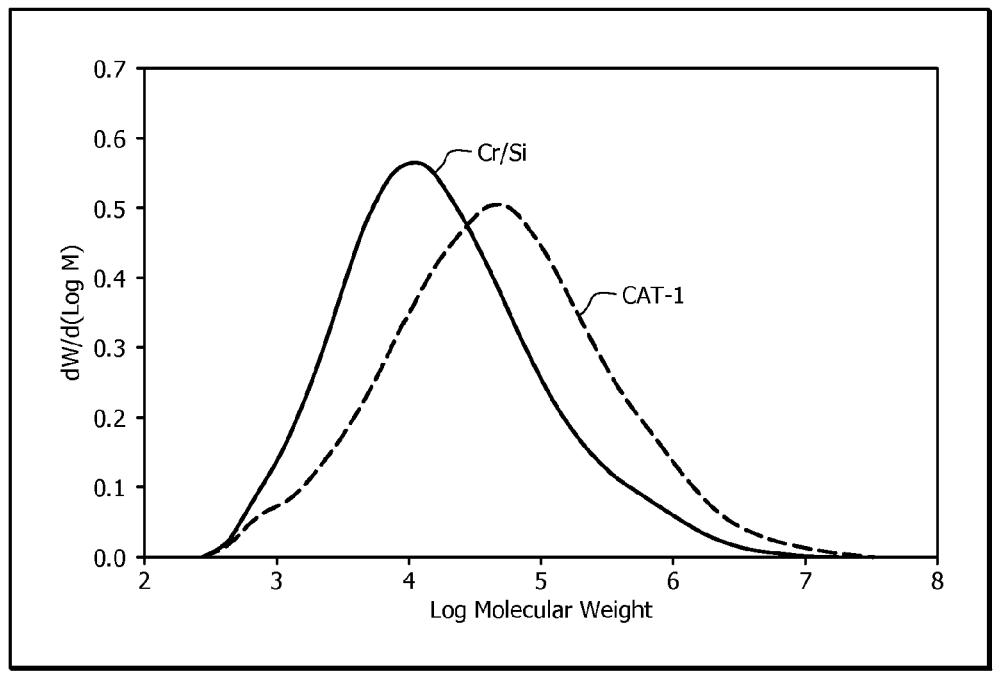
FIGS. 3 and 4 are the molecular weight distribution profiles for the samples from Example 2.

FIG. 3 shows the change in MW distribution caused by the addition of 1 mmol/g of H$_2$SO$_4$ (impregnation) to a Cr/silica, which was then calcined at 400° C. Notice that sulfate changed the MW distribution by the introduction of a great deal of low-MW polymers. The overall $M_w$ decreased and the MI and HLMI increased.

Figure 4:
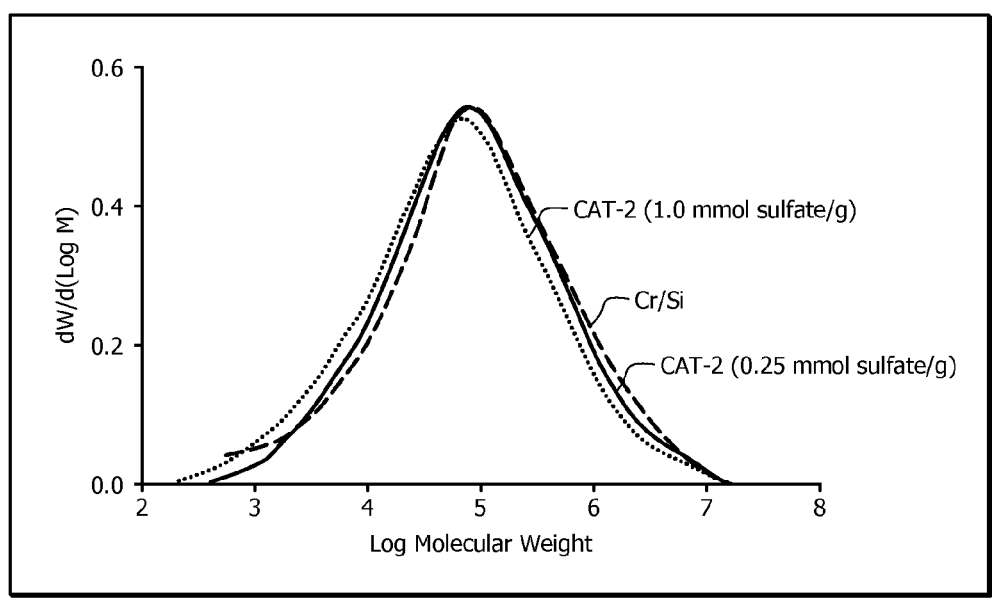
Figure 5:
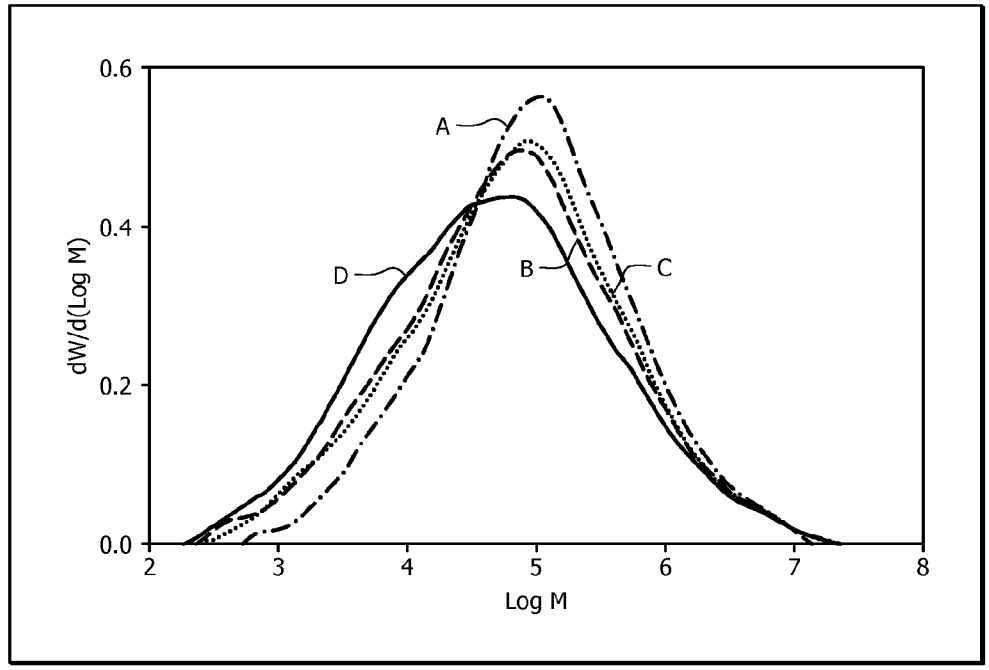
FIG. 5 is a plot of the molecular weight distribution profile of the samples from Example 2 as a function of catalyst productivity.

FIG. 4 shows the change in MW distribution caused by sulfate treatment of a Cr/silica catalyst when the calcination temperature was 500° C. Samples of two CATs, collectively designated CAT-1 and CAT-2, were prepared as described previously herein by impregnation of $H_2SO_4$. Specifically, for CAT-1, Cr/silica was impregnated with $H_2SO_4$ to give a mixture that was then calcined to a temperature of 500° C. CAT-1 has a sulfate loading of 1.0 mmol/g. CAT-2 samples were prepared by impregnating the Cr/silica with $H_2SO_4$ and calcining the mixture to a temperature of 500° C. CAT-2 samples had a sulfate loading of 0.25 mmol sulfate/gram. Samples of CAT-1 and CAT-2 were each utilized to prepare polymer samples and the MWD of the polymer samples for CAT-1 and CAT-2 are presented in FIG. 4. Again one can see that the addition of sulfate causes a shift of the MW distribution to the low-MW region.

One can also see, by comparing FIG. 3 with FIG. 4 that the effect of the sulfate is greater at the lower calcination temperatures. This is consistent with FIG. 1, which demonstrates that the retention of sulfate is strongly influenced by the calcination temperature.

Figure 6:
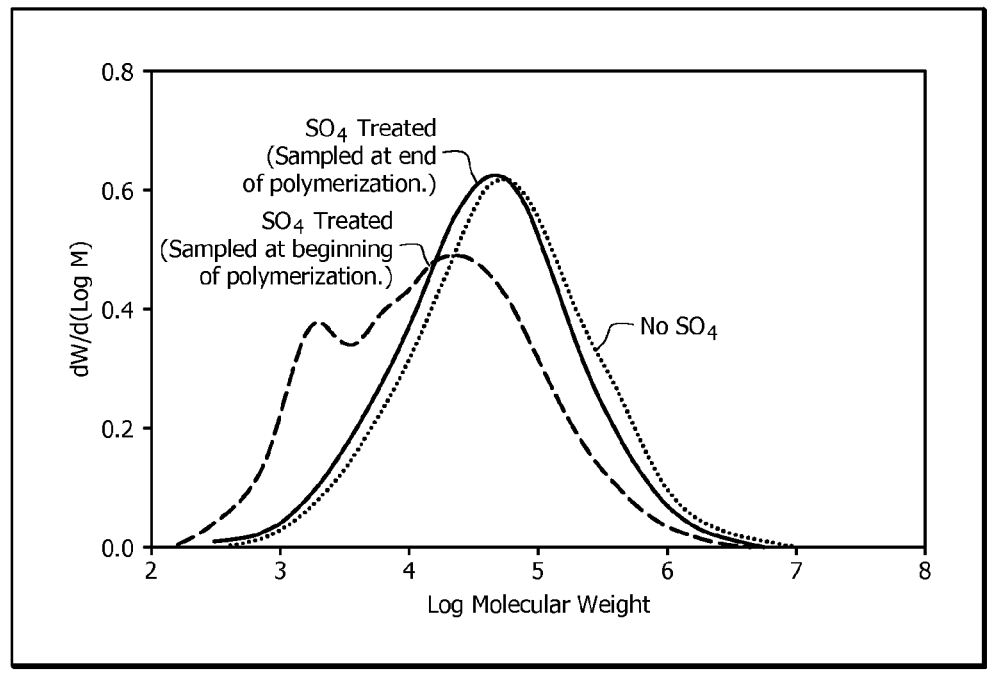
FIG. 6 is a plot of the molecular weight distribution profile of the samples from Example 2 as a function of time.

Further, it was observed that there is a low-MW contribution, a low-MW component that is present early in the run, which then decreases with time. Without wishing to be limited by theory, it is contemplated that the presence of sulfate at low activation temperatures creates active sites that are short lived, but produce a very low-MW peak in the MW distribution. This is depicted in FIG. 6 which shows the change in the MW distribution with time. The samples in FIG. 6 were prepared using a Cr/silica catalyst which was contacted with $H_2SO_4$ to give a mixture that was then calcined to a temperature of 400° C. These polymers were made under the same conditions (105° C., 550 psig) described above. The reaction time is reported in terms of the productivity which increased with time. Table 2 indicates the productivity observed for each MWD profile.

TABLE 2

| MWD Profile | Productivity (g/g) |
|---|---|
| A | 1043 |
| B | 608 |
| C | 341 |
| D | 121 |

FIG. 6 shows this low-MW peak during the early stages of polymerization. In this example, the catalyst was Cr/silica-titania (4% Ti), and it was dry-mixed with 1 mmol/g of ammonium sulfate. The mixture was then calcined at 650° C., and then this catalyst was tested under the conditions described above. The GPC traces were obtained from polymers produced by the same sulfate-treated Cr/silica-titania, activated at 650° C., but in which the reaction time was varied. The productivity, that is the yield of polymer per unit time, obviously increases with time. Thus, the productivity is a surrogate for polymerization time. Notice that there is a separate low-MW peak obtained at very low productivities (low reaction times), which is responsible for lowering he MW.

All these results demonstrate that adding sulfate to Cr/silica catalysts prior to calcination renders them quite active, and modifies the MW distribution to produce lower MW polymer. The MW distribution is broadened on the low-MW side. The sulfate can be added as sulfuric acid, or ammonium sulfate, or another sulfate compound, in which the cation is volatile or harmless to the process. The presence of sulfate influences the behavior of the catalyst. But, sulfate is also quite volatile and is easily evaporated by heat.

Finally, Table 3 summarizes the changes in melt index, high load melt index, and $M_w$ obtained by adding sulfate to both Cr/silica and Cr/silica-titania prior to calcination. In the table, results can be seen from two catalysts, Cr/silica and Cr/silica-titania as described above, at various calcination temperatures, at various sulfate loadings, and using the two methods of sulfate incorporation described above (impregnation of $H_2SO_4$ or dry-mixing of ammonium sulfate). In Table 3 one can see the effect of sulfate on the melt index, the high load melt index, and on the $M_w$ of the polymer obtained from these catalysts.

TABLE 3

| Catalyst | $SO_4$ Source | mmol $SO_4$ per g | Calcining Temp. | Melt Index g/10 min | High Load Melt Index g/10 min | $M_w$ kg/mol | $M_w/M_n$ |
|---|---|---|---|---|---|---|---|
| $Cr/SiO_2$ | None | 0.00 | 400° C. | 0.02 | 6.5 | 405 | 49.4 |
| | $H_2SO_4$, aq | 1.00 | 400° C. | 3.40 | 290 | 102 | 18.0 |
| $Cr/SiO_2$ | None | 0.00 | 500° C. | 0.03 | 1.68 | 414 | 25.7 |
| | $H_2SO_4$, aq | 0.25 | 500° C. | 0.03 | 2.70 | 380 | 20.9 |
| | $H_2SO_4$, aq | 0.50 | 500° C. | 0.03 | 4.70 | 351 | 25.1 |
| | $H_2SO_4$, aq | 1.00 | 500° C. | 0.06 | 4.80 | 310 | 30.0 |
| | $H_2SO_4$, aq | 2.00 | 500° C. | 0.04 | 3.90 | 351 | 24.0 |
| $Cr/SiO_2$ | None | 0.00 | 700° C. | 0.11 | 9.5 | 238 | 10.6 |
| | $H_2SO_4$, aq | 0.25 | 700° C. | 0.07 | 5.9 | 209 | 14.0 |
| | $H_2SO_4$, aq | 0.50 | 700° C. | 0.08 | 4.6 | 203 | 12.9 |
| | $H_2SO_4$, aq | 1.00 | 700° C. | 0.08 | 4.0 | 203 | 11.6 |
| | $H_2SO_4$, aq | 2.00 | 700° C. | 0.07 | 2.0 | 210 | 10.5 |
| | $(NH_4)_2SO_4$, dry | 1.00 | 700° C. | 0.07 | 7.2 | 275 | 13.0 |
| $CrSiO_2$ | None | 0.00 | 871° C. | 0.28 | 24.0 | 169 | 8.9 |
| | $H_2SO_4$, aq | 0.25 | 871° C. | 0.18 | 12.9 | 134 | 8.4 |
| | $H_2SO_4$, aq | 0.50 | 871° C. | 0.10 | 10.0 | 131 | 6.9 |
| | $H_2SO_4$, aq | 1.00 | 871° C. | 0.10 | 8.5 | 144 | 8.8 |
| | $H_2SO_4$, aq | 2.00 | 871° C. | 0.36 | 25.8 | 130 | 10.1 |
| $Cr/SiO_2—TiO_2$ | None | 0.00 | 600° C. | 0.36 | 23.9 | 203 | 13.3 |
| | $H_2SO_4$, alc | 0.40 | 600° C. | 0.36 | 27.1 | 178 | 15.4 |
| | $H_2SO_4$, alc | 1.00 | 600° C. | 0.44 | 37.6 | 144 | 42.5 |
| | $(NH_4)_2SO_4$, dry | 0.50 | 600° C. | 1.03 | 61.7 | 146 | 12.9 |
| | $(NH_4)_2SO_4$, dry | 1.00 | 600° C. | 0.81 | 43.2 | 130 | 10.8 |

TABLE 3-continued

| Catalyst | SO$_4$ Source | mmol SO$_4$ per g | Calcining Temp. | Melt Index g/10 min | High Load Melt Index g/10 min | M$_w$ kg/mol | M$_w$/M$_n$ |
|---|---|---|---|---|---|---|---|
| Early in run | (NH$_4$)$_2$SO$_4$, dry | 1.00 | 600° C. | 5.01 | 294 | 72 | 18.0 |
| Cr/SiO$_2$—TiO$_2$ | None | 0.00 | 650° C. | 0.40 | 26.1 | 174 | 9.9 |
|  | H$_2$SO$_4$, alc | 0.25 | 650° C. | 0.49 | 27.3 | 150 | 9.4 |
|  | H$_2$SO$_4$, alc | 0.50 | 650° C. | 0.66 | 42.2 | 142 | 10 |
|  | H$_2$SO$_4$, alc | 1.00 | 650° C. | 0.32 | 20.7 | 176 | 10.9 |
|  | H$_2$SO$_4$, alc | 2.00 | 650° C. | 0.39 | 25.1 | 161 | 9.9 |
| Cr/SiO$_2$—TiO$_2$ | None | 0.00 | 871° C. | 2.81 | 156 | 131 | 9.0 |
|  | H$_2$SO$_4$, alc | 0.25 | 871° C. | 4.90 | 253 | 97 | 8.9 |
|  | H$_2$SO$_4$, alc | 0.50 | 871° C. | 3.06 | 165 | 102 | 8.0 |
|  | H$_2$SO$_4$, alc | 1.00 | 871° C. | 3.23 | 159 | 88 | 7.5 |
|  | H$_2$SO$_4$, alc | 2.00 | 871° C. | 2.11 | 116 | 129 | 7.8 | aq = aqueous,
alc = alcohol

The following enumerated embodiments are provided as non-limiting examples.

A first embodiment which is a method comprising contacting a silica support material with a sulfating agent to form a sulfated silica support material comprising sulfate anions; thermally treating the sulfated silica support material to form a thermally treated sulfated silica support material; contacting the thermally treated sulfated silica support material with a chromium-containing compound to form a mixture; and thermally treating the mixture to form a polymerization catalyst.

A second embodiment which is the method of the first embodiment wherein thermally treating the sulfated silica support material comprises heating the sulfated silica support material to a temperature of from about 300° C. to about 900° C. for a time period of from about 1 min to about 24 hours.

A third embodiment which is the method of any one of the first through second embodiments wherein thermally treating the mixture comprises heating the mixture to a temperature of from about 400° C. to about 800° C. for a time period of from about 30 min to about 15 hours in an oxygen-containing atmosphere.

A fourth embodiment which is the method of any one of the first through third embodiments wherein the sulfating agent comprises SO$_3$, H$_2$SO$_4$, (NH$_4$)$_2$SO$_4$, Al$_2$(SO$_4$)$_3$, CuSO$_4$, ZnSO$_4$, ZrOSO$_4$, TiOSO$_4$, (NH$_4$)HSO$_4$, (NH$_4$)HSO$_3$, Cr$_2$(SO$_4$)$_3$, or combinations thereof.

A fifth embodiment which is the method of any one of the first through fourth embodiments wherein the sulfating agent comprises a sulfating-precursor material.

A sixth embodiment which is the method of any one of the first through fifth embodiments wherein the sulfating precursor material comprises sulfate salts, SO$_3$, sulfur halides, or combinations thereof.

A seventh embodiment which is the method of any one of the first through sixth embodiments wherein the polymerization catalyst has a sulfate anion content of from about 0.1 wt. % to about 3.0 wt. %.

An eighth embodiment which is the method of any one of the first through seventh embodiments wherein the silica support material has a surface area of from about 100 m$^2$/gram to about 1000 m$^2$/gram, a pore volume in the range of from about 0.1 cm$^3$/gram to about 4.0 cm$^3$/gram and an average particle size in the range of from about 5 μm to about 500 μm.

A ninth embodiment which is the method of any one of the first through eighth embodiments wherein the silica support material comprises greater than about 50 percent silica by weight of the support.

A tenth embodiment which is the method of any one of the first through ninth embodiments wherein the wherein the polymerization catalyst has a silica support material content of from about 90 wt. % to about 99.9 wt,% based on a final weight of the polymerization catalyst.

An eleventh embodiment which is the method of any one of the first through tenth embodiments wherein the polymerization catalyst has a chromium content of from about 0.1 wt % to about 10.0 wt % based on a final weight of the polymerization catalyst.

A twelfth embodiment which is the method of any one of the first through eleventh embodiments further comprising contacting a monomer with the polymerization catalyst under conditions suitable for the formation of a polymer and recovering the polymer.

A thirteenth embodiment which is the method of the twelfth embodiment wherein the polymer has a melt index of from about 0.01 g/10 min. to about 100 g/10 min.

A fourteenth embodiment which is the method of any one of the twelfth through thirteenth embodiments wherein the polymer melt index is increased by from about 5% to about 200 fold when compared to the melt index of a polymer obtained from an otherwise identical catalyst made in the absence of sulfate.

A fifteenth embodiment which is the method of any one of the twelfth through fourteenth embodiments wherein the polymer has a high load melt index of from about 0.01 g/10 min. to about 100 g/10 min.

A sixteenth embodiment which is the method of any one of the twelfth through fifteenth embodiments wherein the polymer has a high load melt index that is increased by from about 5% to about 200 fold when compared to the melt index of a polymer obtained from an otherwise identical catalyst made in the absence of sulfate.

A seventeenth embodiment which is the method of any one of the twelfth through sixteenth embodiments wherein the polymer has a weight average molecular weight of from about 50 kg/mol to about 600 kg/mol.

An eighteenth embodiment which is the method of any one of the twelfth through seventeenth embodiments wherein the polymer has a weight average molecular weight that is decreased by from about 5% to about 99% when compared to the weight average molecular weight of a polymer obtained from an otherwise identical catalyst made in the absence of sulfate.

A nineteenth embodiment which is the method of any one of the first through eighteenth embodiments further comprising drying the sulfated silica support material, the mixture, or both.

A twentieth embodiment which is the method of any one of the first through nineteenth embodiments further comprising forming the polymer into an article.

A twenty-first embodiment which is a method comprising thermally treating a silica support material to form a thermally treated silica support material, contacting the thermally treated silica support material with a sulfating agent to form a thermally treated sulfated silica support material, thermally treating the thermally treated sulfated silica support material to form a processed silica support material, contacting the processed silica support material with a chromium-containing compound to form a precursor polymerization catalyst, and thermally treating the precursor polymerization catalyst to form a polymerization catalyst.

A twenty-second embodiment which is a method comprising contacting a silica support material with a sulfating agent and a chromium-containing compound to form a mixture, and thermally treating the mixture to form a polymerization catalyst.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the Description of Related Art is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
   contacting a silica support material consisting essentially of silica with a sulfating agent to form a sulfated silica support material comprising sulfate anions;
   thermally treating the sulfated silica support material to form a thermally treated sulfated silica support material;
   contacting the thermally treated sulfated silica support material with a chromium-containing compound to form a mixture;
   thermally treating the mixture to form a polymerization catalyst wherein the polymerization catalyst has a sulfate anion content of from about 0.1 wt. % to about 3.0 wt. %;
   contacting a monomer with the polymerization catalyst under conditions suitable for the formation of a polymer; and
   recovering the polymer wherein the polymer has a weight average molecular weight that is decreased by from about 5% to about 99% when compared to the weight average molecular weight of a polymer obtained from an otherwise identical catalyst made in the absence of the sulfating agent.

2. The method of claim 1 wherein thermally treating the sulfated silica support material comprises heating the sulfated silica support material to a temperature of from about 300° C. to about 900° C. for a time period of from about 1 min to about 24 hours.

3. The method of claim 1 wherein thermally treating the mixture comprises heating the mixture to a temperature of from about 400° C. to about 800° C. for a time period of from about 30 min to about 15 hours in an oxygen-containing atmosphere.

4. The method of claim 1 wherein the sulfating agent comprises $SO_3$, $H_2SO_4$, $(NH_4)_2SO_4$, $Al_2(SO_4)_3$, $CuSO_4$, $ZnSO_4$, $ZrOSO_4$, $TiOSO_4$, $(NH_4)HSO_4$, $(NH_4)HSO_3$, $Cr_2(SO_4)_3$, or combinations thereof.

5. The method of claim 1 wherein the sulfating agent comprises a sulfating-precursor material.

6. The method of claim 5 wherein the sulfating precursor material comprises sulfate salts, $SO_3$, sulfur halides, or combinations thereof.

7. The method of claim 1 wherein the silica support material has a surface area of from about 100 $m^2$/gram to about 1000 $m^2$/gram, a pore volume in the range of from about 0.1 $cm^3$/gram to about 4.0 $cm^3$/gram and an average particle size in the range of from about 5 μm to about 500 μm.

8. The method of claim 1 wherein the wherein the polymerization catalyst has a silica support material content of from about 90 wt. % to about 99.9 wt,% based on a final weight of the polymerization catalyst.

9. The method of claim 1 wherein the polymerization catalyst has a chromium content of from about 0.1 wt % to about 10.0 wt % based on a final weight of the polymerization catalyst.

10. The method of claim 1 wherein the polymer has a melt index of from about 0.01 g/10 min. to about 100 g/10 min.

11. The method of claim 1 wherein the polymer melt index is increased by from about 5% to about 200 fold when compared to the melt index of a polymer obtained from an otherwise identical catalyst made in the absence of the sulfating agent.

12. The method of claim 1 wherein the polymer has a high load melt index of from about 0.01 g/10 min. to about 100 g/10 min.

13. The method of claim 1 wherein the polymer has a high load melt index that is increased by from about 5% to about 200 fold when compared to the melt index of a polymer obtained from an otherwise identical catalyst made in the absence of the sulfating agent.

14. The method of claim 1 wherein the polymer has a weight average molecular weight of from about 50 kg/mol to about 600 kg/mol.

15. The method of claim 1 further comprising drying the sulfated silica support material, the mixture, or both.

16. The method of claim 1 further comprising forming the polymer into an article.

17. A method comprising:
thermally treating a silica support material consisting essentially of silica to form a thermally treated silica support material;
contacting the thermally treated silica support material with a sulfating agent to form a thermally treated sulfated silica support material;
thermally treating the thermally treated sulfated silica support material to form a processed silica support material;
contacting the processed silica support material with a chromium-containing compound to form a precursor polymerization catalyst;
thermally treating the precursor polymerization catalyst to form a polymerization catalyst;
contacting a monomer with the polymerization catalyst under conditions suitable for the formation of a polymer; and
recovering the polymer wherein the polymer has a weight average molecular weight that is decreased by from about 5% to about 99% when compared to the weight average molecular weight of a polymer obtained from an otherwise identical catalyst made in the absence of the sulfating agent.

18. A method comprising:
contacting a silica support material consisting essentially of silica with a sulfating agent and a chromium-containing compound to form a mixture;
thermally treating the mixture to form a polymerization catalyst;
contacting a monomer with the polymerization catalyst under conditions suitable for the formation of a polymer; and
recovering the polymer wherein the polymer has a weight average molecular weight that is decreased by from about 5% to about 99% when compared to the weight average molecular weight of a polymer obtained from an otherwise identical catalyst made in the absence of the sulfating agent.

19. The method of claim 1 wherein the polymer comprises polyethylene.

20. The method of claim 1 wherein the polymer has a molecular weight distribution of from about 5 to about 50.

21. The method of claim 17 wherein the sulfating agent comprises $SO_3$, $H_2SO_4$, $(NH_4)_2SO_4$, $Al_2(SO_4)_3$, $CuSO_4$, $ZnSO_4$, $ZrOSO_4$, $TiOSO_4$, $(NH_4)HSO_4$, $(NH_4)HSO_3$, $Cr_2(SO_4)_3$, or combinations thereof.

22. The method of claim 18 wherein the sulfating agent comprises $SO_3$, $H_2SO_4$, $(NH_4)_2SO_4$, $Al_2(SO_4)_3$, $CuSO_4$, $ZnSO_4$, $ZrOSO_4$, $TiOSO_4$, $(NH_4)HSO_4$, $(NH_4)HSO_3$, $Cr_2(SO_4)_3$, or combinations thereof.

* * * * *